2,700,039

PENICILLIN SALTS OF N-PHENYLURETHANES

Gustav Ehrhart, Heinrich Ruschig, and Leonhard Stein, Bad Soden (Taunus), and Walter Aumüller, Frankfurt am Main, Germany, assignors to Farbwerke Hoechst Aktiengesellschaft vormals Meister Lucius und Bruning, Frankfurt am Main Höchst, Germany, a German company No Drawing. Application February 3, 1953,
Serial No. 334,965

Claims priority, application Germany February 7, 1952

4 Claims. (Cl. 260—239.1)

This invention relates to sparingly soluble penicillin salts more particularly to those of basically substituted phenyl-urethanes which are suitable for the manufacture of depot-penicillin preparations.

The sodium salt of penicillin is widely used for therapeutic purposes. It has, however, the disadvantage that it is eliminated from the blood vessel within a few hours. In order to overcome this disadvantage depot-penicillins have been manufactured which, for example, after intra-muscular injection in aqueous suspension, maintain the penicillin level in the blood up to 24 hours. The organic bases used for the manufacture of these depot-penicillins must fulfill certain conditions, for example, they should be well tolerated, and, if possible, have an anesthetic effect.

The penicillin salts with such bases again should be sparingly soluble in water, readily crystallisable and easily workable; moreover, they should be likewise well tolerated, when administered.

The present invention is based on the observation that salts which are sparingly soluble in water are obtained by reacting N-phenyl-urethanes which may carry substituents at the aromatic nucleus and possess a basically substituted alkyl group as ester radical, or a salt thereof, with penicillin, or a salt thereof. The compounds attained according to this invention which may still be substituted at the phenyl nucleus, correspond to the following formula

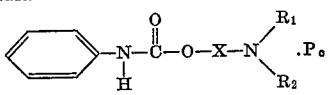

in which X represents a bivalent hydrocarbon radical, $R_1$ stands for hydrogen or alkyl, $R_2$ stands for a lower non-cyclic or a lower cyclic alkyl, $R_1$ and $R_2$ together with the nitrogen atom stand for a residue of a heterocyclic ring system and $P_c$ stands for penicillin.

The N-phenyl-urethanes are obtained by reacting, for example, phenylisocyanate with morpholino ethanol, N-propyl-N-benzyl-amino-ethanol, N-butyl-N-benzyl-amino-ethanol or a similar substance. The benzyl radical is split off by catalytic hydrogenation.

As will be seen from the following examples the hydrochlorides of the above-mentioned urethane-compounds yield with sodium penicillin crystallised salts which are sparingly soluble in water. They can be recrystallised from organic solvents. It is also possible to obtain the penicillin salts by reacting the free bases directly with penicillin in a suitable organic solvent. Acetic acid ester has proved to be a particularly suitable solvent.

The N-phenyl-urethanes are anesthetics which are well tolerated when administered and have a good stability. A penicillin salt with such a base is sparingly soluble in water, partly less than 0.3 per cent.

The products obtained by the invention shall be used as depot-penicillins for therapeutical purposes.

Especially valuable is n-butylamino-ethyl-(phenyl)-urethane-penicillin, a salt soluble in water only to 0.25%, which is a very good depot-penicillin of a particularly good tolerance. The preparation is non-irritant and does not produce necrosis. By the administration of the usual doses for a depot penicillin preparation, for example, doses of 300,000 and 400,000 units per injection, a therapeutically active blood level lasts for as long as 72 hours. For example, the average blood level of 5 patients, after intra-muscular injection of 400,000 units each, showed after 1 hour 0.45, after 24 hours 0.22, after 48 hours 0.14, after 60 hours 0.09, and after 70 hours 0.09 I. U. per cc. of blood.

Furthermore, this compound is also suitable for oral administration. No buffer need be applied as protection against the gastric acid, as would be the case with sodium penicillin G. Following the administration of tablets without buffer, the blood level values are as good as, or even better than, after the intake of tablets with addition of a buffer. For example, on administration of one tablet each of 200,000 units of n-butylamino-ethyl-N-(phenyl)-urethane-penicillin without buffer, the average penicillin blood level per cc. after 1 hour amounts to 0.92 unit, after 2 hours to 0.9 unit, after 3 hours to 0.68 unit, after 4 hours to 0.4 unit and after 5 hours to 0.23 unit. Fasting patients show after a single administration of 200,000 units a therapeutically active blood level for 8 hours.

As is known, the administration of depot-penicillin on the basis of procaine-penicillin frequently gives rise to allergies caused by the procaine-component. In such cases, for example, the administration of n-butylamino-ethyl-N-(phenyl)-urethane-penicillin is especially advantageous.

The following examples serve to illustrate the invention but they are not intended to limit it thereto.

*Example 1.—Propylaminoethyl-N-(phenyl)-urethane-penicillin*

(a) 10.35 grams of propylaminoethyl-N-(phenyl)-urethane-hydrochloride are dissolved in 25 cc. of water and to this solution 14.74 grams of sodium penicillin G in 30 cc. of water are added. The salt at first separates in an oily state but crystallises after a short time. The crystals are filtered off with suction, washed with 20 cc. of water and then dried. The yield amounts to 21.5 grams. The product melts with decomposition at 144° C. (uncorrected). It can be recrystallised from acetone.

(b) 14.24 grams of sodium penicillin G in 100 cc. of water are added to a solution of 10.35 grams of propyl-aminoethyl-N-(phenyl)-urethane-hydrochloride in 500 cc. of water. After adding crystals of a previous batch, the penicillin salt crystallises out slowly. The product melts with decomposition at 144° C.–145° C. (uncorrected).

*Example 2(a).—Butylaminoethyl-N-(phenyl)-urethane-penicillin*

14.24 grams of sodium penicillin G in 50 cc. of water are added in portions to a solution of 10.88 grams of butylaminoethyl-N-(phenyl)-urethane-hydrochloride in 200 cc. of water so that the penicillin salt precipitates in the form of crystals; by adding the sodium penicillin G too quickly, the salt can at first be obtained as an oil. The crystals are filtered off with suction, washed with 30 cc. of water and then dried. The yield amounts to 19.7 grams. The crystals melt with decomposition at 144° C. (uncorrected). After crystallisation from methanol-ether, the melting point rises to 148° C.–149° C. (uncorrected), while the product decomposes.

*Example 2(b)*

(1) 84 grams of n-butylaminoethyl-N-(phenyl)-urethane-hydrochloride are dissolved in water. The solution is rendered alkaline with potassium carbonate and the free urethane is taken up in 600 cc. of acetic ester. The acetic ester solution is shaken with water and dried with sodium sulfate.

(2) 120 grams of sodium penicillin G are dissolved in water. Phosphoric acid is added until a pH of 2 is attained and the free penicillin is taken up in 1.4 litres of acetic ester. The solution is washed in water and dried with sodium sulfate. The solutions (1) and (2) are combined; a crystallised product of n-butylaminoethyl-N-(phenyl)-urethane-penicillin is soon obtained which, after being filtered off with suction and dried in the desiccator, melts with decomposition at 148° C.–149° C. The yield amounts to 157 grams.

Example 2(c)

3.56 grams of sodium penicillin G are mixed in an Erlenmeyer flask with a glass stopper, fitted together by grinding, with 2.73 grams of pulverised n-butylamino-ethyl-N-(phenyl)-urethane-hydrochloride and 40 cc. of acetic ester are poured over without mixing. 20 cc. of water are added and the whole is then shaken for a short time. The solid salts soon dissolve. From the acetic ester, n-butylamino - N - (phenyl) - urethane - penicillin gradually separates in well defined needles which are filtered off with suction and washed with water. The yield amounts to about 5 grams. The crystals melt with decomposition at 148° C.–149° C. The proportions of water and acetic ester can vary within wide limits.

Example 2(d)

3.56 grams of sodium penicillin G are dissolved in 20 cc. of water and 2.73 grams of n-butylaminoethyl-N-(phenyl)-urethane-hydrochloride are dissolved in 40 cc. of water and 15 cc. of acetone. Both solutions are mixed. A clear solution is obtained from which n-butylaminoethyl-N-(phenyl)-urethane-penicillin, gradually crystallises out in a good yield as well defined needles. The crystals are filtered off with suction, washed with a little water and dried in the desiccator. The product melts with decomposition at 148° C.–149° C.

Example 3.—Cyclohexylaminoethyl-N-(phenyl)-urethane-penicillin 10.68 grams of sodium penicillin G in 200 cc. of water are added to a solution of 8.95 grams of cyclohexylaminoethyl-N-(phenyl)-urethane-hydrochloride in 800 cc. of water. After adding crystals of a previous batch to the solution, the penicillin salt crystallises out. The yield amounts to 9.8 grams; the salt melts with decomposition at 153° C. (uncorrected).

Example 4.—Morpholino-ethyl-N-(phenyl)-urethane-penicillin 10.68 grams of sodium penicillin G in 30 cc. of water are added to a solution of 8.6 grams of morpholino-ethyl-N-(phenyl)-urethane-hydrochloride in 30 cc. of water. The penicillin salt at first separates as an oil and then crystallises out. The yield amounts to 13.75 grams; the product melts at 81° C.–83° C. (uncorrected).

Example 5.—Butylaminoethyl-N-(4-ethoxy-phenyl)-urethane-penicillin 1.58 grams of sodium penicillin G in 10 cc. of water are added to a solution of 1.58 grams of butylaminoethyl-N-(4-ethoxy-phenyl)-urethane hydrochloride in 10 cc. of water. The penicillin salt at first separates as an oil but then crystallises out in long needles; it can be recrystallised to form acetic esters or methanol-ether. The crystals melt at 105° C.–106° C. (uncorrected).

Example 6.—(Beta-ethyl-butyl)-aminoethyl-N - (phenyl)-urethane-penicillin 12 grams of (beta-ethyl-butyl)-aminoethyl-N-(phenyl)-urethane-hydrochloride are dissolved in 90 cc. of methanol and a solution of 14.4 grams of sodium penicillin G in 80 cc. of water is added. The precipitating (beta-ethyl-butyl)-aminoethyl-N-(phenyl)-urethane - penicillin is filtered off with suction and recrystallised from methanol with addition of ether. It melts with decomposition at 95° C.–97° C. The yield amounts to 92%.

Example 7.—Diethylaminoethyl-N-(4-hydroxyphenyl)-urethane-penicillin 11.54 grams of diethylaminoethyl-N-(4-hydroxyphenyl)-urethane-hydrochloride are dissolved in 20 cc. of water and added to a solution of 14.6 grams of sodium penicillin G in 30 cc. of water. The diethylaminoethyl-N-(4-hydroxyphenyl)-urethane-penicillin crystallises out slowly. It is filtered off with suction after being allowed to stand for some time in ice, washed with a little water and dried in the desiccator. Yield: 16.65 grams. The product melts with decomposition at 122° C.–123° C.

Example 8.—Pyrrolidinoethyl-N-(4-hydroxyphenyl)-urethane-penicillin (1) 6.2 grams of sodium penicillin G are dissolved in water, the solution is acidified with phosphoric acid of 10 per cent. strength and the precipitated penicillin is taken up in 2 times 75 cc. of acetic ester. The acetic ester solution is washed with water and dried with sodium sulfate.

(2) 4 grams of pyrrolidinoethyl-N-(4-hydroxyphenyl)-urethane-hydrochloride are dissolved in water and converted into the free base by the addition of potassium carbonate. The free base is taken up in 100 cc. of acetic ester, washed with water and dried with sodium sulfate.

The solutions (1) and (2) are combined and 100 cc. of acetone are added thereto. From the clear solution the pyrrolidinoethyl-N-(4-hydroxyphenyl)-urethane - penicillin precipitates in the form of crystals in a very good yield. The crystals melt with decomposition at 157° C.

We claim:

1. The compound of the formula

2. The compound of the formula

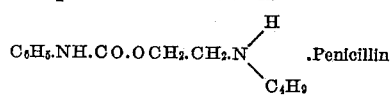

3. The compound of the formula

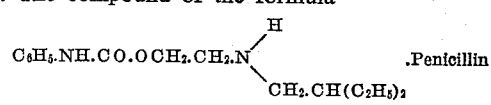

4. A compound of the general formula

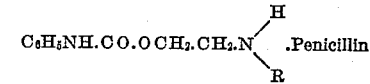

wherein R represents a lower alkyl radical having 2–6 carbon atoms.

References Cited in the file of this patent

UNITED STATES PATENTS

| | | |
|---|---|---|
| 2,539,483 | Ruskin | Jan. 30, 1951 |
| 2,625,543 | Ruskin | Jan. 13, 1953 |